United States Patent [19]

Mizutani et al.

[11] Patent Number: 5,687,047
[45] Date of Patent: Nov. 11, 1997

[54] MAGNETIC TAPE CARTRIDGE HAVING TRIPLE LID ASSEMBLY

[75] Inventors: Hikaru Mizutani, Mino; Mikihisa Inoue, Otokuni-gun; Kenmei Masuda, Yokohama; Hidekazu Takeda, Hiratsuka, all of Japan

[73] Assignees: Hitachi Maxell, Ltd., Osaka-fu; Hitachi, Ltd., Tokyo-to, both of Japan

[21] Appl. No.: 677,779

[22] Filed: Jul. 10, 1996

Related U.S. Application Data

[63] Continuation of Ser. No. 350,075, Nov. 29, 1994, abandoned.

[30] Foreign Application Priority Data

Nov. 29, 1993 [JP] Japan ................................. 5-326195

[51] Int. Cl.$^6$ ............................. G11B 23/02; G11B 23/04; G03B 23/02
[52] U.S. Cl. ........................ 360/132; 360/19.5; 242/347.1
[58] Field of Search ................................. 360/132, 96.5; 242/347.1, 347.2, 347; 220/336, 338, 343

[56] References Cited

U.S. PATENT DOCUMENTS

| | | | |
|---|---|---|---|
| 2,347,981 | 5/1944 | Apfelbaum | 220/343 |
| 5,404,261 | 4/1995 | Ohira et al. | 360/132 |
| 5,407,145 | 4/1995 | Iwahashi | 242/347.1 |
| 5,422,773 | 6/1995 | Ozaki et al. | 360/132 |
| 5,453,896 | 9/1995 | Ohira | 360/132 |
| 5,497,279 | 3/1996 | Nishijima et al. | 360/132 |
| 5,537,280 | 7/1996 | Ikebe et al. | 360/132 |

FOREIGN PATENT DOCUMENTS

| | | |
|---|---|---|
| 0290918 | 11/1988 | European Pat. Off. . |
| 0 570132 | 11/1993 | European Pat. Off. . |
| 2 508223 | 6/1982 | France . |
| 5-342803 | 12/1993 | Japan . |

*Primary Examiner*—Tom Thomas
*Assistant Examiner*—Adriana Giordana
*Attorney, Agent, or Firm*—Birch, Stewart, Kolasch & Birch, LLP

[57] ABSTRACT

A magnetic tape cartridge includes a casing having a tape chamber defined therein for accommodating a reeled magnetic recording tape and, also, box arms protruding outwardly from a front wall section of the casing so as to leave a loading bay that opens upwardly, frontwardly and downwardly and is thus delimited by upwardly, frontwardly and downwardly oriented open areas. The casing includes a lid assembly for selectively concealing and exposing that portion of magnetic recording tape and including front, top and rear lids operatively linked together. The front and top lids are adapted to selectively open and close the frontwardly and upwardly oriented open areas of the loading bay, respectively, while the rear lid is positioned within the loading bay and adapted to selectively open and close a space delimited between the front and the rear lid. At least first and second, generally cylindrical bosses extend between the top and bottom panels of the casing and are positioned at respective points of intersection between inner side walls of the box arms, which confront the loading bay, and the front wall section so as to partially protrude laterally into the loading bay. Each boss has a positioning hole defined axially therein so as to extend exteriorly through one of the top and bottom walls of the casing and is comprised of upper and lower boss segments aligned axially with each other. The upper boss segment has an outer diameter smaller than that of the lower boss segment.

5 Claims, 8 Drawing Sheets

Fig. 9
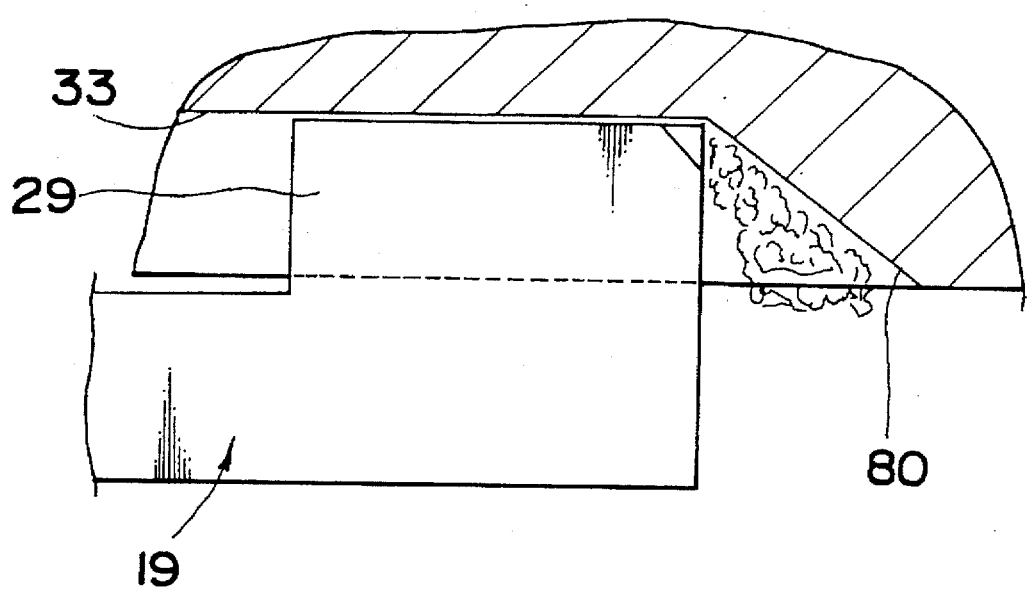
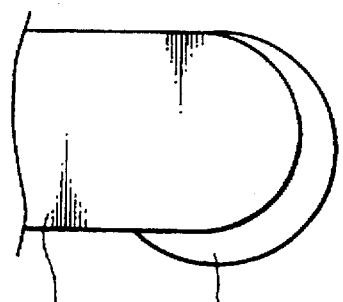
Fig. 10A
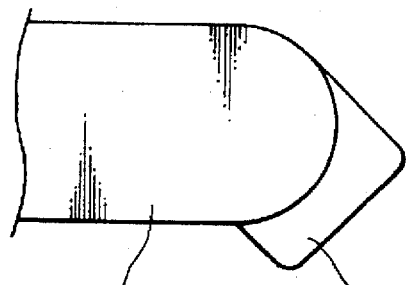
Fig. 10B
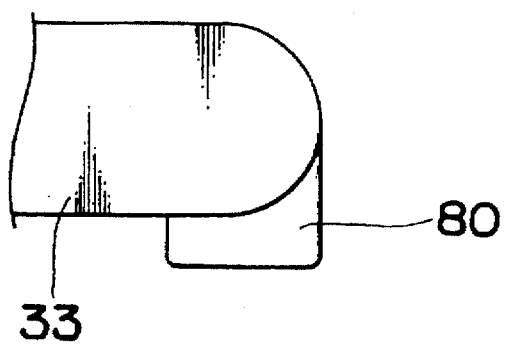
Fig. 10C

MAGNETIC TAPE CARTRIDGE HAVING TRIPLE LID ASSEMBLY

This application is a continuation of application Ser. No. 08/350,075, filed on Nov. 29, 1994, now abandoned.

BACKGROUND OF THE INVENTION

1. (Field of the Invention)

The present invention generally relates to a magnetic tape cartridge of a type having a protective lid assembly and, more particularly, to a mechanism in the magnetic tape cartridge for selectively opening and closing the protective lid assembly for exposing and concealing portion of a length of magnetic recording tape in relation to an in formation recording and/or reproducing head assembly.

2. (Description of the Prior Art)

The magnetic tape cartridge of the type referred to above includes, for example, an 8-mm video tape cartridge of a structure shown in FIG. 11. This illustrated magnetic tape cartridge comprises a casing 1 includes generally rectangular flat top and bottom panels, opposite side walls and front and rear walls, all of said side, front and rear walls being disposed between the top and bottom panels to keep them spaced apart a distance to define a tape chamber. The front wall is set back inwardly to define a generally U-shaped loading bay 6 in the casing 1 while leaving box arms on respective sides thereof that protrudes forwardly in a direction perpendicular to the longitudinal sense of the magnetic tape cartridge. Specifically, the loading bay 6 is delimited by inner side walls 7 of the respective box arms, that confront with each other, and the inwardly set-back front wall 8. This casing 1 accommodates therein a pair of reels to which opposite ends of a length of magnetic recording tape are anchored, respectively. A portion of the length of magnetic recording tape 2 drawn from one of the reels 3 and emerging outwardly from one of the box arms is adapted to travel towards the other of the box arms across the loading bay 6 and is then turned around the other of the reels.

The loading bay 6 is known as a space defined to permit various tape loading and unloading elements, forming parts of a tape loading and unloading mechanism in a magnetic recording and/or reproducing device with which the magnetic tape cartridge works, to be selectively inserted thereinto or withdrawn therefrom in response to loading or unloading of the tape magnetic tape cartridge. Specifically, when the magnetic tape cartridge is loaded in the magnetic tape player, that portion of the magnetic recording tape 2 traversing the loading bay 6 between the box arms is drawn out of the loading bay 6 and turned generally halfway around the rotary head-carrier cylinder in the tape player, but when the magnetic tape cartridge is to be removed from the tape player, that portion of the magnetic recording tape 2 is withdrawn into the loading bay 6.

While the magnetic tape cartridge is not in use, e.g., while the magnetic tape cartridge is not inserted into the magnetic tape player, that portion of the magnetic recording tape extending between the box arms across the loading bay 6 is protected by a transversely extending lid assembly which is generally comprised of front and rear lids 17 and 20 facing front and rear surfaces of the length of magnetic recording tape, respectively. the front and rear lids 17 and 20 are operatively linked together to move between open and closed positions as indicated by the phantom and solid lines in FIG. 11, respectively.

The inner side walls 7 of the respective box arms have respective guide grooves 40 defined therein in a mirror image fashion with each other for guiding the front and rear lids 17 and 20 in unison between the open and closed positions as is well known to those skilled in the art. Thus, movement of the double lid assembly from the closed position towards the open position allows that portion of the magnetic recording tape 2 to be exposed to the outside of the magnetic tape cartridge while movement of the double lid assembly from the open position towards the closed position allows that portion of the magnetic recording tape 2 to be concealed in a space between the front and rear lid 17 and 20 as shown.

In order for the magnetic tape cartridge to be accurately positioned relative to the head-carrier cylinder when it is loaded in the tape player, the casing 1 has a pair of positioning holes 9 each extending into a respective boss 11 through the bottom panel. Each boss 11 is substantially cylindrical in section and extends between the top and bottom panels of the casing 1 and is located generally at a junction between the front wall 8 and the associated side wall 7 of the box arm with a lateral portion 11a of the outer periphery of the boss 11 protruding into the loading bay 6. Protrusion of the lateral portion 11a of the outer periphery of each of the cylindrical bosses 11 into the loading bay 6 is necessitated to secure, within a limited space inside the casing 1, a sufficient outer diameter of each boss 11 which is in turn necessitated to secure a required diameter of the respective positioning hole 9.

On the other hand, as part of the attempt to render the magnetic recording and/or reproducing system to be compact, attempts have been made to make the 8-mm video tape cartridge compact. To this end, it has been suggested, as disclosed in, for example, the Japanese Laid-open Patent Publication No. 57, 210489, to use a triple lid assembly including, in addition to the front and rear lids, a top lid operatively linked with the front and rear lids to open an upper region above that portion of the magnetic recording tape 2 in response to movement of the front and rear lids towards the open position. The use of the top lid in combination with the front and rear lids makes it possible to increase the opening of the lid assembly while preserving a limited area of the loading bay.

A problem of interest would arise when attempt is made to employ mechanisms of the 8-mm video tape cartridge, in which the outer lateral portions of the cylindrical bosses necessarily protrude into the loading bay, in the magnetic tape cartridge of a type employing the triple lid assembly referred to above. In the magnetic tape cartridge designed to assist the system to be rendered compact, the area of the side wall 7 of each box arm is reduced and, therefore, protrusion of the outer lateral portions 11a of the respective cylindrical bosses 11 into the loading bay 6 often constitutes a cause of interference between left and right ends of the rear lid 20 and those outer lateral portions 11a of the respective bosses 11.

In order to substantially eliminate this problem, it may be envisaged to either reduce the width of the rear lid 20 as measured in a direction from one side wall to the other side wall of the casing, or relocate the guide grooves 40 for the rear lid 20 to a position further away from the front wall 8. It has, however, been found that reduction in width of the rear lid 20 may result in formation of a gap between each side wall 7 and the adjacent end of the rear lid 20 through which dust may deposit on that portion of the magnetic recording tape, whereas relocation of the guide grooves 40 requires an increase of the area of each side wall 7 facing the loading bay 6 and does therefore bring about a result contrary to the attempt to make the system compact.

SUMMARY OF THE INVENTION

The present invention has accordingly been devised to provide an improved magnetic tape cartridge of a type employing a triple lid assembly, wherein improvement is made to the design and the shape of each of the cylindrical bosses having the positioning hole defined therein, thereby to make it possible to render the system to be compact and also to ensure a smooth movement of the lid assembly without interfering with the casing.

To this end, the present invention provides a magnetic tape cartridge including a casing having top and bottom panels and a peripheral wall disposed between the top and bottom panels to keep them spaced apart a distance to define a tape chamber. The peripheral wall includes front and rear wall sections and a pair of side wall sections, all assembled together to render the tape cartridge to represent a generally rectangular box-like configuration and, also, box arms protruding outwardly from the front wall section in communication with the tape chamber so as to form a loading bay that opens upwardly, frontwardly and downwardly and that is delimited by upwardly, frontwardly and downwardly oriented open areas. A pair of freely rotatable reels are accommodated within the casing, and a length of magnetic recording tape has its opposite end anchored to the respective reels and adapted to travel from one reel to the other reel, when the tape cartridge is in use within a magnetic recording and/or reproducing apparatus, with a portion of the length of magnetic recording tape traversing across the loading bay at a location spaced a distance from the front wall section.

The magnetic tape cartridge of the present invention also includes a lid assembly for selectively concealing and exposing that portion of magnetic recording tape and including front, top and rear lids operatively linked together. The front lid is carried by the casing for pivotal movement about a transverse axis, extending parallel to the front wall section, between first and second positions. This front lid when in said first position closes the frontwardly oriented open area of the loading bay, but when in said second position it opens the frontwardly oriented open area of the loading bay. On the other hand, the top lid is hingedly connected with the front lid and movable between third and fourth positions in unison with the movement of the front lid between the first and second positions, respectively. This top lid when in said third position closes the upwardly oriented open area of the loading bay, but when in said fourth position, opens the upwardly oriented open area of the loading bay. Again, the rear lid is hingedly connected to the top lid and movable between fifth and sixth positions in unison with the movement of the top lid between the third and fourth positions, respectively. This rear lid when in said fifth position is positioned within the loading bay and rearwardly of the front lid to substantially confine that portion of magnetic recording tape within a space delimited between the front lid in the first position and the rear lid in the fifth position, but when in said sixth position, positioned generally above the loading bay and in part beneath the front lid in the second position and in part beneath the top lid in the fourth position. That portion of magnetic recording tape is exposed to the outside when the front lid is moved to the second position accompanied by movement of the top lid to the third position which is in turn accompanied by movement of the rear lid to the sixth position.

At least two cylindrical bosses extend between the top and bottom panels of the casing within the casing and each boss is positioned at a point of intersection between an inner side wall of the respective box arm, which confronts the loading bay, and the front wall section so as to partially protrude laterally into the loading bay. Each boss has a positioning hole defined axially therein so as to extend exteriorly through one of the top and bottom walls of the casing and is composed of upper and lower boss segments aligned axially with each other. The upper boss segment has an outer diameter smaller than that of the lower boss segment.

According to the present invention, each of the cylindrical bosses is comprised of the top and bottom boss segments integral with the respective top and bottom casing halves, said top boss segment having an outer diameter smaller than that of the bottom boss segment to allow that lateral portion of the periphery of the top boss segment to protrude into the loading bay a radial distance smaller than that lateral portion of the periphery of the bottom boss segment. Accordingly, it is possible to avoid any possible interference between the bosses and the rear lid while a sufficient diameter is secured in each of the positioning holes and, therefore, a smooth movement of the rear lid between the lowered and lifted position is possible, thereby making it possible to make the system compact.

Preferably, a transit between the top and bottom boss segments in each boss is defined by the outwardly tapering surface formed at the upper end of the bottom boss segment. Accordingly, even though the path of movement of the rear lid between the lowered and lifted positions is defined at a position slightly rearwardly with respect to the ideal path of movement thereof, the rear lid may slide over the outwardly tapering surface to facilitate a smooth movement of the rear lid.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 9 is a fragmentary side sectional view, on a further enlarged scale, showing a modified guide groove employed in the magnetic tape cartridge of the present invention;

FIGS. 10A to 10C are schematic diagrams showing further modified forms of the guide grooves employed in the magnetic tape cartridge of the present invention, respectively.

DETAILED DESCRIPTION OF THE EMBODIMENTS

Figure 1:
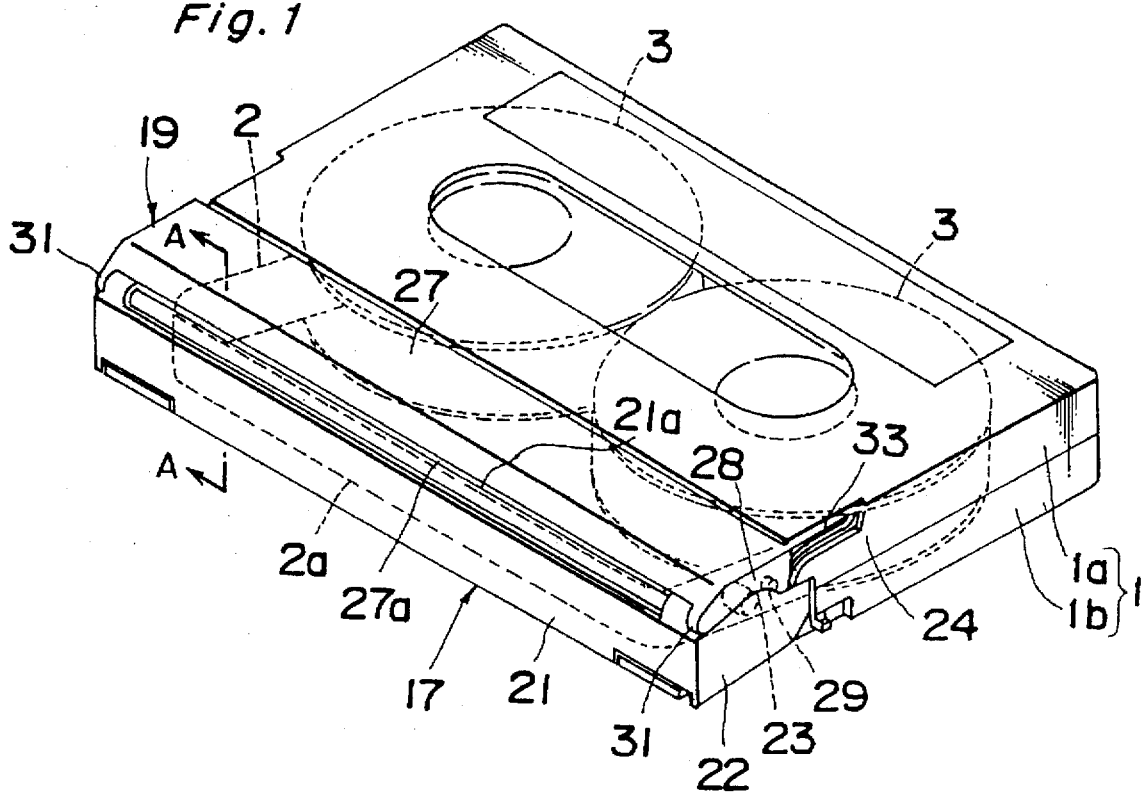
FIG. 1 is a perspective view of a magnetic tape cartridge embodying the present invention.
Figure 2:
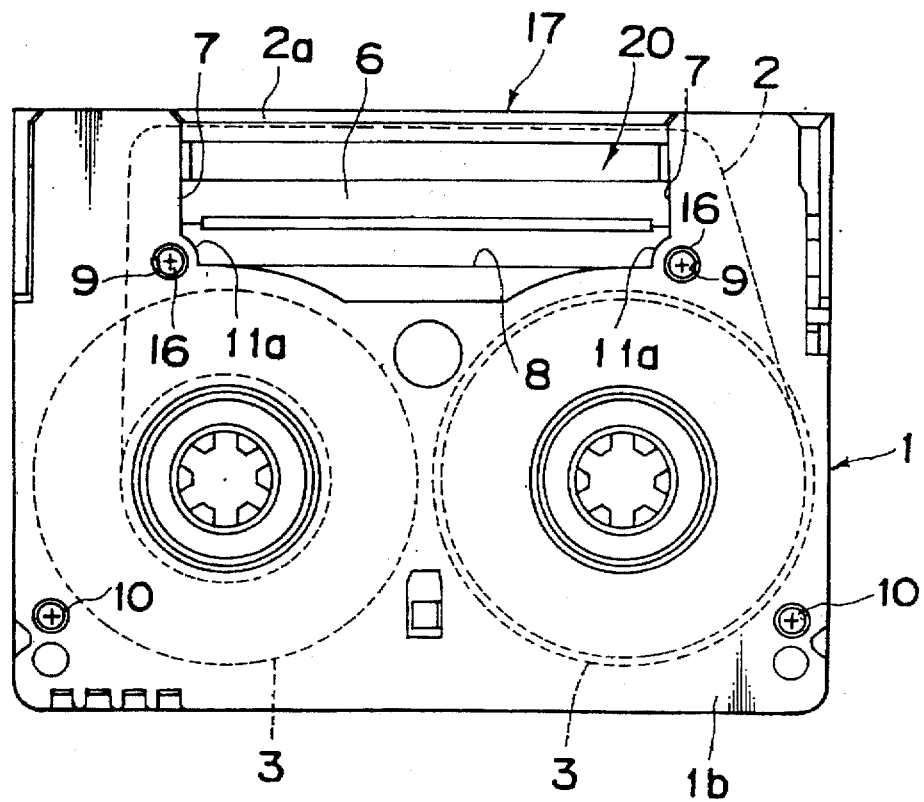
FIG. 2 is a bottom plan view of the magnetic tape cartridge.
Figure 3:
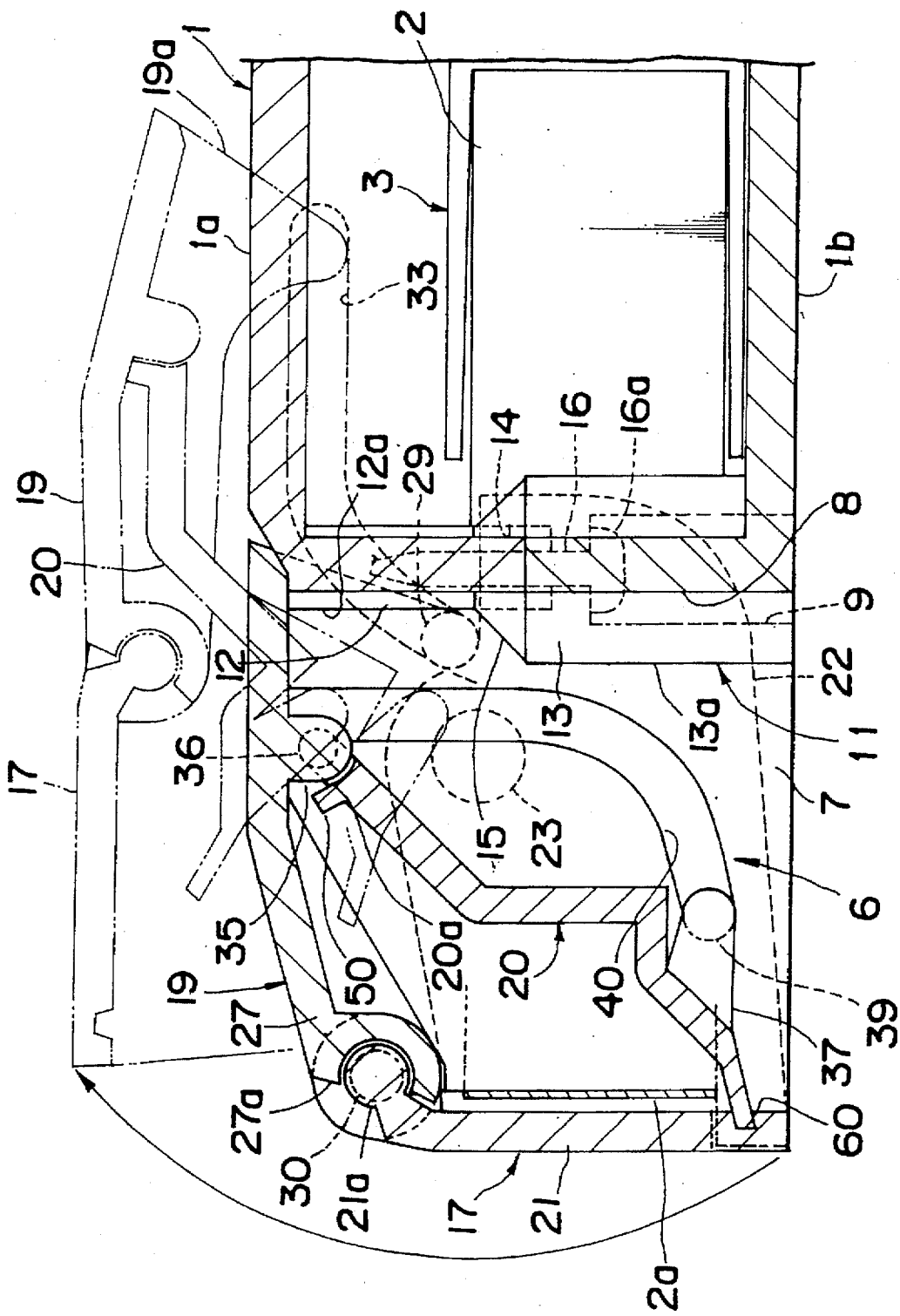
FIG. 3 is a fragmentary side sectional view, on an enlarged scale, of a front portion of the magnetic tape cartridge taken along the line A—A shown in FIG. 1.
Figure 4:
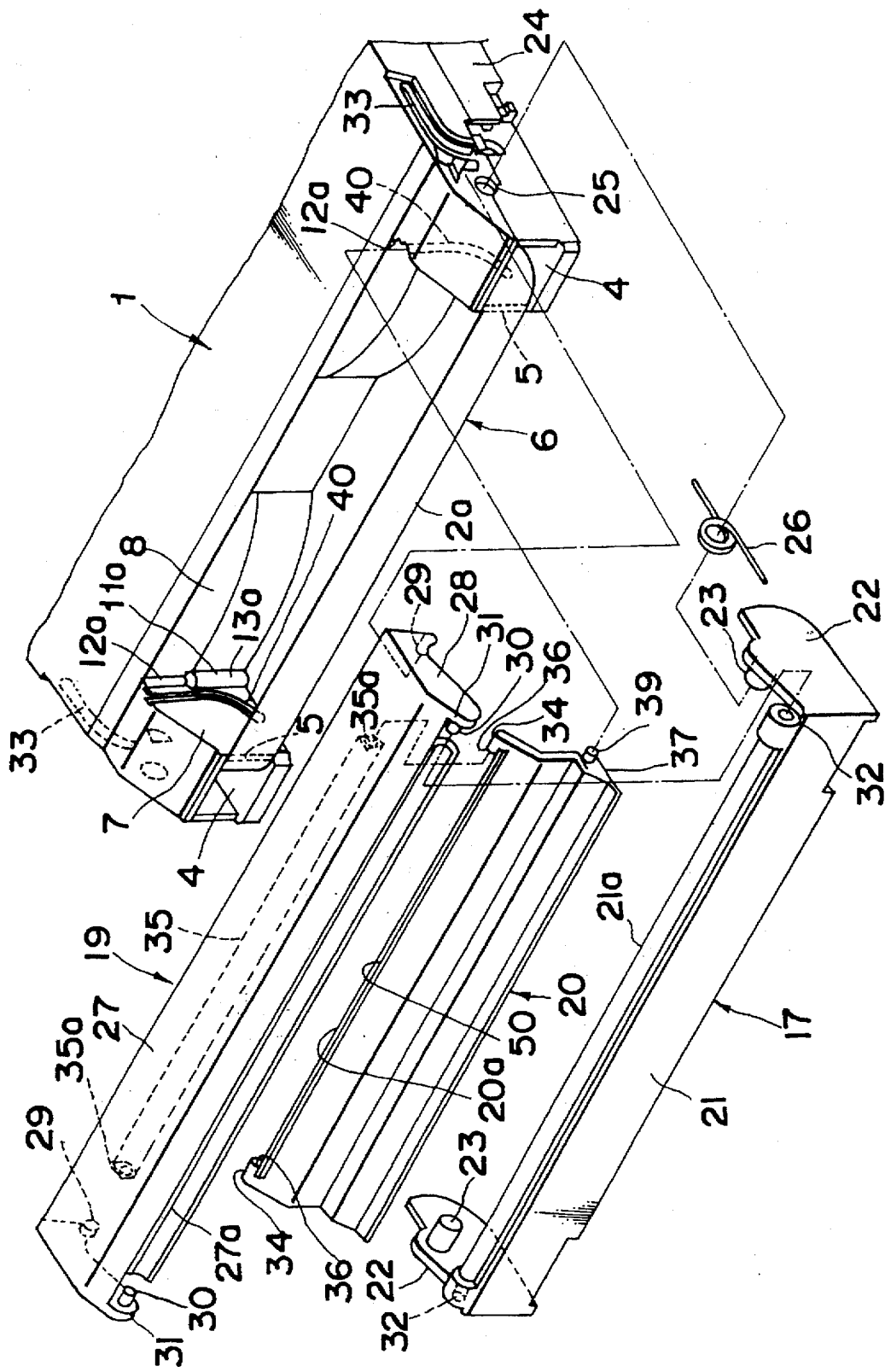
FIG. 4 is an exploded view, on an enlarged scale, of that front portion of the magnetic tape cartridge.
Figure 5:
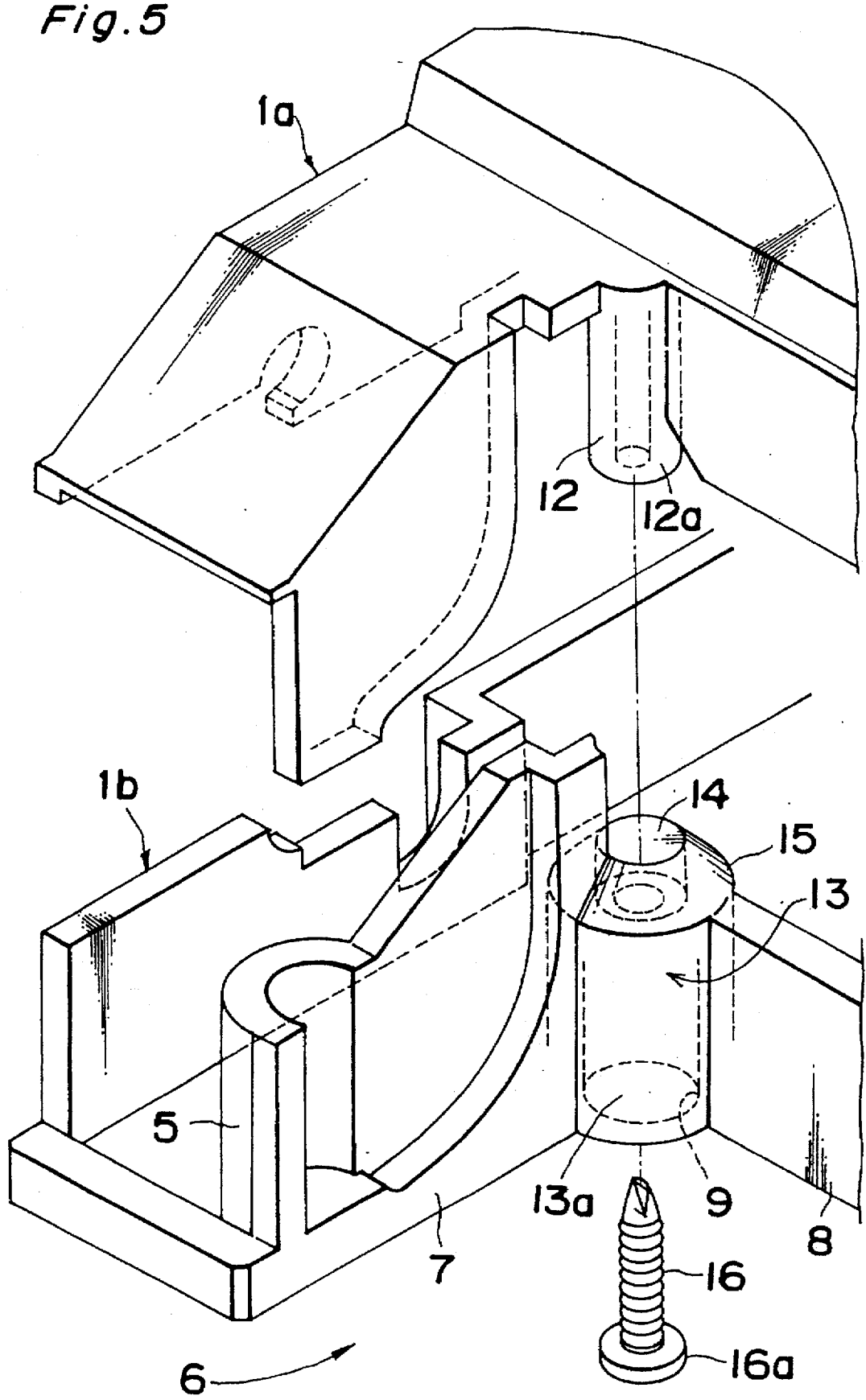
FIG. 5 is an exploded view, on a further enlarged scale, showing one of bosses employed in the magnetic tape cartridge embodying the present invention.

Referring now to FIGS. 1 to 7, a magnetic tape cartridge shown therein according to a first preferred embodiment of the present invention comprises, as best shown in FIGS. 1, 2 and 4, a casing 1 including generally rectangular flat top and bottom panels, opposite side walls 24 and front and rear walls (only the front wall being indicated by 8), all of said side, front and rear walls being disposed between the top and bottom panels to keep them spaced apart a distance to define a tape chamber. In practice, however, the casing 1 is generally made of plastics and includes top and bottom casing halves 1a and 1b joined together to render the casing 1 to represent a generally rectangular, generally flattened box-like configuration as is well known to those skilled in the art.

The casing 1 accommodates therein a pair of reels 3 rotatably housed in position within the tape chamber of the magnetic tape cartridge. These reels 3 have opposite ends of a length of magnetic recording tape 2 anchored thereto, respectively, so that a length of magnetic recording tape 2 drawn from one of the reels 3 can be taken up around the other of the reels 3 during the use of the magnetic tape cartridge in a magnetic tape player.

In order for that portion 2a of the length of magnetic recording tape 2, which extends outside the casing 1 along the front wall 8 thereof, to be operatively brought into engagement with the rotary head-carrier cylinder in a magnetic tape player (not shown), the casing 1 has left-hand and right-hand box arms 4 protruding frontwardly therefrom so as to terminate at a position spaced a distance away from the front wall 8 of the casing 1, said box arms 4 opening outwardly in a direction away from the front wall 8 of the casing 1. The box arms 4 has respective inner side walls 7 which cooperate with the front wall 8 of the casing 1 to define a loading bay 6. As discussed previously, the loading bay 6 opens upwardly, downwardly and frontwardly and is known as a space defined to permit the various tape loading and unloading elements to be selectively inserted thereinto or withdrawn therefrom in response to loading or unloading of the tape magnetic tape cartridge into or from the magnetic tape player.

Thus, it will readily be seen that the length of magnetic recording tape 2 that is to travel one of the reels 3 towards the other of the reels 3 across the loading bay 6 extends through one of the box arms 4 adjacent such one of the reels 3 so as to emerge outwardly from the casing 1 and then extend into the other of the box arms 4 adjacent such other of the reels 3, with that portion 2a of the magnetic recording tape 2 having traversed the loading bay 6 in a direction spaced from and generally parallel to the front wall 8 of the casing 1. In order for that portion 2a of magnetic recording tape 2 to be smoothly guided across the loading bay 6, front upright edges of the inner side walls 7 defining parts of the respective box arms 4 are chamfered as shown by 5 in FIG. 5 to define a chamfered guide. Alternatively, a rotatably supported spindle or roller may be employed for the chamfered guide.

As best shown in FIG. 3, the casing 1 has front and rear pairs of positioning holes 9 and 10 defined in the bottom panel thereof. Specifically, each of the positioning holes 9 of the front pair extends completely across the thickness of the bottom panel of the casing 1 and then into a respective cylindrical boss 11 formed at the junction between the adjacent inner side wall 7 and the front wall 8. Considering the casing 1 made up of the top and bottom casing halves 1a and 1b, each cylindrical boss 7 is also made up of top and bottom boss segments 12 and 13 which are formed integrally with the top and bottom panels of the casing 1 and which are concentrically abutted together, when the top and bottom casing halves 1a and 1b are joined together, to complete the respective cylindrical boss 11.

Figure 11:
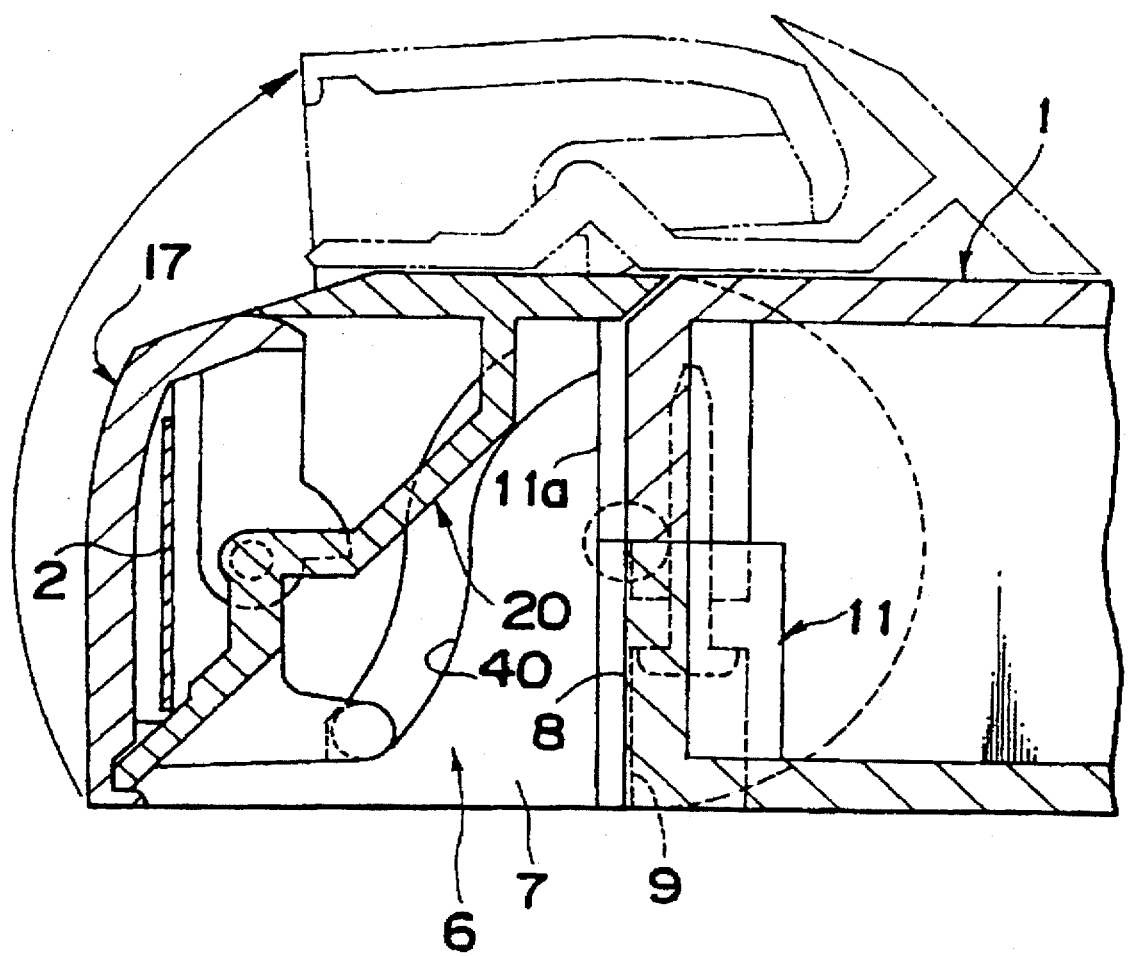
FIG. 11 is a fragmentary side sectional view of a front portion of the conventional magnetic tape cartridge.

As discussed previously, each of the cylindrical bosses 11 must have a sufficient outer diameter in order to secure a required diameter of each of the positioning holes 9 within a limited space available inside the casing 1 so that the tape cartridge can be made compact in size. For this reason, as clearly shown in FIG. 5, it has been a customary practice to allow that lateral portion 11a of the outer periphery of each cylindrical boss 11 protrudes into the loading bay 6 as shown in FIG. 11. However, in the practice of the present invention, only the bottom boss segment 13 of each cylindrical boss 11 integral with the bottom casing half 1b has the associated positioning hole 9 defined therein and also has an outer diameter sufficient to secure the required diameter of the associated positioning hole 9 whereas the top boss segment 12 integral with the top casing half 1a has an outer diameter as small as possible, i.e., a reduced outer diameter as compared with that of the bottom boss segment 13. By so doing, it will readily be seen that, even though a lateral portion 13a of the outer periphery of the bottom boss segment 13 protrudes into the loading bay 6 a radial distance corresponding to that over which that portion 11a of the outer periphery of each boss 11 shown in FIG. 11 protrudes, a lateral portion 12a of the outer periphery of the top boss segment 12 is radially inwardly set back relative to that lateral portion 13a of the outer periphery of the bottom boss segment 13 to thereby provide a sufficient space for accommodating a movement of an associated one of opposite ends of a rear lid 20 as will be described later.

In other words, while each cylindrical boss 11 shown in FIG. 11 has an outer diameter uniform over the entire length thereof between the top and bottom panels of the casing 1, each cylindrical boss 11 employed in the practice of the present invention has large and reduced diameters which are occupied by the bottom and top boss segments 13 and 12, respectively, with an upper end of said bottom boss segment 13 chamfered at 15 so as to taper radially inwardly towards the associated top boss segment 12 as best shown in FIG. 3. Thus, when the top and bottom casing halves 1a and 1b are joined together to complete the magnetic tape cartridge, lower ends of the top boss segments 12 are received within respective bearing holes or recesses 14 defined in the upper ends of the associated bottom boss segments 13 in coaxial relation with the corresponding positioning holes 9.

After the top and bottom casing halves 1a and 1b have been joined together with the lower ends of the top boss segments 12 engaged in the bearing holes 14 in the upper ends of the bottom boss segments 13, tapping screws 16 are inserted into the positioning holes 9 in the bottom boss segments 13 and are then threadingly tapped into the top boss segments 12 to connect the top and bottom casing halves 1a and 1b together. So far illustrated, these tapping screws 16 are utilized to serve as two of a plurality of fastening members used to firmly connect the top and bottom casing halves 1a and 1b together, However, the use of the tapping screws 16 is not essential in the practice of the present invention if the other fastening members serve the purpose of connecting the top and bottom casing halves 1a and 1b together.

Where each of the cylindrical bosses 11 is concurrently used as a connecting boss such as shown, the corresponding tapping screw 16 is tapped into the associated positioning hole 9 with its head 16a positioned deep into the positioning hole 9 to secure the associated positioning hole 9 beneath the head 16a of the respective tapping screw 16 as shown by the phantom line in FIG. 3.

That portion 2a of the length of magnetic recording tape 2 extending between the chamfered guides 5 of the box arms 4 across the loading bay 6 is, when the magnetic tape cartridge is not in use, concealed and, therefore, protected by a triple lid assembly including a front lid 17, a top lid 19 and a rear lid 20 all made of plastics and extending substantially parallel to each other between the box arms 4. The details of the triple lid assembly will now be described.

As best shown in FIGS. 1, 3 and 4, the front lid 17 is of one-piece construction including a generally rectangular plate 21 adapted to close a front opening of the loading bay 6 and, also, forwardly oriented openings of the box arms 4, and left-hand and right-hand arms 22 protruding from opposite ends of the rectangular plate 21 in a direction perpendicular thereto and towards the rear of the casing 1. The left-hand and right-hand arms 22 have respective axially aligned pivot pins 23 protruding therefrom in a direction close towards each other and rotatably engaged in respective bearing holes 25 defined in the side walls 24 of the casing 1. Thus, it will readily be seen that the front lid 17 is pivotable about a common axis of the pivot pins 23 between a forwardly oriented position, in which as best shown by the solid line in FIGS. 1 and 3, the rectangular plate 21 lies parallel to that portion 2a of magnetic recording tape 2 while closing the front opening of the loading bay 6 and the forwardly oriented openings of the box arms 4, and an upwardly oriented position as shown by the phantom line in FIG. 3. However, by the action of a spring element such as a torsion spring 26 mounted on at least one of the pivot pins 23 with its opposite ends connected respectively to the front lid 17 and the associated side wall 24 of the casing 1, the front lid 17 is normally biased to assume the forwardly oriented position as shown by the solid line in FIGS. 1 and 3.

The top lid 19 is also of one-piece construction including a generally rectangular plate 27 and left-hand and right-hand end walls 28 protruding opposite ends of the rectangular plate 27 in a direction perpendicular thereto and downwardly as viewed in FIG. 4. The left-hand and right-hand end walls 28 have respectively axially aligned guide pins 29 protruding therefrom in a direction close towards each other. This top lid 19 is supported for movement between a front position, in which as shown by the solid line in FIGS. 1 and 3, the top lid 19 closes the upwardly oriented opening of the loading bay 6 including a space immediately above that portion 2a of magnetic recording tape 2, and a rear position substantially above the top panel of the casing 1 as shown by the phantom line in FIG. 3. This movement of the top lid 19 between the front and rear positions takes place in response to the movement of the front lid 17 between the forwardly and upwardly oriented positions and, for this purpose, the front and top lids 17 and the 19 are operatively linked together in a manner which will now be described.

As best shown in FIGS. 3 and 4, the end walls 28 integral with the opposite ends of the rectangular plate 27 of the top lid 19 protrude a distance outwardly from a front edge 27a of the rectangular plate 27 to define respective bearing arms 31. These bearing arms 31 are formed with axially aligned pivot pins 30 which are pivotally engaged in bearing pieces 32 integral with an upper edge 21a of the rectangular plate 21 of the front lid 17, which bearing pieces 32 are so positioned as to be encompassed within the distance between the opposite end walls 28 of the top lid 19.

Also, for the purpose as will subsequently become clear, the top lid 19 has a rib 35 integrally formed with an inner surface of the rectangular plate 27 and having its opposite ends formed with axially inwardly extending bearing holes 35a. Although the rib 35 is shown to extend a substantial distance longitudinally of the rectangular plate 27 and may therefore be utilized to reinforce the top lid 19, two separate bearing protuberances having the respective bearing holes 35a defined therein may be employed in place of the single rib 35.

Thus, it will be understood that the front lid 17 and the top lid 19 are pivotally connected with each other, one pivotable relative to the other about a common axis extending between the pivot pins 30. The guide pins 29 integral with the respective end walls 28 are slidably engaged in respective guide grooves 33 defined in outer surfaces of the side walls 24, said guide grooves 33 being so shaped and so curved that, as the top lid 19 is moved from the front position, shown by the solid line in FIG. 3, towards the rear position shown by the phantom line, the top lid 19 substantially in flush with the top panel of the casing 1 is upwardly shifted while moving rearwardly of the casing 1 and finally assumes a position generally above the top panel of the casing 1 upon arrival at the rear position. As a matter of design, this movement of the top lid 19 from the front position towards the rear position follows the movement of the front lid 17 from the forwardly oriented position towards the upwardly oriented position.

As best shown in FIGS. 3, the rear lid 20 is also operatively linked with the front lid 17 through the top lid 19 in a manner as will be described subsequently and is movable between a lowered position, in which as shown by the solid line the rear lid 20 is positioned rearwardly of that portion 2a of magnetic recording tape 2, and a lifted position in which as shown by the phantom line the rear lid 20 assumes a position generally above the loading bay 6 to thereby clear the rear of that portion 2a of magnetic recording tape 2 for permitting the tape loading and unloading elements to engage that portion 2a of magnetic recording tape 2. Specifically, this rear lid 20 is moved from the lowered position towards the lifted position as the top lid 19 is moved from the front position towards the rear position, and vice versa.

For this purpose, as shown in FIGS. 3 and 4, the rear lid 20 includes an upper edge 20a having its opposite ends formed with respective bearing protuberances 34 which are in turn formed with axially aligned bearing pins 36 extending therefrom so as to confront with each other. The rear lid 20 is pivotally coupled with the top lid 19 with the bearing pins 36 pivotally engaged in the respective bearing holes 35a in the rib 35 integral with the top lid 19.

The rear lid 20 also includes legs 37 formed integrally therewith so as to protrude rearwardly therefrom adjacent a lower edge opposite to the upper edge 20a, which legs 37 are formed integrally with respective guide pins 39 that protrude outwardly in a direction away from each other. These guide pins 39 are slidingly engaged in generally J-shaped guide grooves 40, respectively, each of said guide grooves 40 being defined in the inner side wall 7 of the associated box arm 4 at a location frontwardly of that portion 13a of the outer periphery of the respective cylindrical boss 13. Thus, it will readily be understood that, as the top lid 19 is moved from the front position towards the rear position with the guide pins 29 slidingly guided along the respective guide grooves 33, the rear lid 20 is moved from the lowered position towards the lifted position with the guide pins 39 slidingly guided along the respective guide grooves 40 and that, at the time the top lid 19 is held at the rear position with the front lid 17 in the upwardly oriented position held substantially in flush with the top lid 19 as shown by the respective phantom lines in FIG. 3, the rear lid 20 is held immediately below the pivotal joint between the front and top lids 17 and 19 and generally above the loading bay 6 as shown by the phantom line in FIG. 3.

The triple lid assembly of the construction described above operates in the following manner.

When the magnetic tape cartridge embodying the present invention is loaded into the magnetic tape player (not shown) in the known manner, the front lid 17 is pivoted about the common axis of the pivot pins 23 against the biasing force of the torsion spring 26 so as to move from the frontwardly oriented position towards the upwardly oriented position. As the front lid 17 so moves, it pushes the top lid 19 to move the latter from the front position towards the rear position with the guide pins 29 slidingly guided along the guide grooves 33. During the movement of the top lid 19 towards the rear position, the front edge 27a of the rectangular plate 27 of the top lid 19 is shifted upwardly of the loading bay 6 and is then moved rearwardly of the casing 1 because of the curved profile of the guide grooves 33 and finally assumes the rear position, shown by the phantom line in FIG. 3, substantially simultaneously with arrival of the front lid 17 at the upwardly oriented position as shown by the phantom line in FIG. 3.

Simultaneously with the start of movement of the top lid 19 from the front position towards the rear position having been pushed by the front lid 17, the rear lid 20 starts its movement from the lowered position towards the lifted position with the guide pins 39 slidingly guided along the guide grooves 40 so as to move upwardly in the respective guide grooves 40. Thus, the rear lid 20 is first moved a slight distance rearwardly and is then moved upwardly and rearwardly and finally assumes the lifted position at which the rear lid 20 occupies a position below the front and top lids 17 and 19, then in flush with each other, and above the loading bay 6, allowing that portion 2a of magnetic recording tape 2 to be completely exposed to the outside in readiness for engagement with the loading and unloading elements in the tape player.

It is to be noted that, during the movement of the rear lid 20 from the lowered position towards the lifted position, the opposite ends of the rear lid 20 move adjacent the lateral portions 12a of the outer peripheries of the respective top boss segments 12. However, since as one of the features of the present invention the lateral portion 12a of the outer periphery of each top boss segment 12 is radially inwardly set back relative to the lateral portion 13a of the outer periphery of the mating bottom boss segment 13, it is possible to allow the opposite ends of the rear lid 20 to move closer to the cylindrical bosses 11 than that where each cylindrical boss has a uniform outer diameter over the entire length thereof such as shown in and discussed with reference to FIG. 11 and, hence, an upper region of each of the guide grooves 40 can advantageously be defined at a location close towards the lateral portion 12a of the outer periphery of each top boss segment 12 with no possibility of the cylindrical bosses 11 interfering the movement of the rear lid 20.

Also, the upper end of each of the bottom boss segments 13 has been described and shown as chamfered so as to taper radially inwardly towards the associated top boss segment 12 to thereby define the outwardly tapering surface 15. Accordingly, where a clearance is provided in the pivotal joint between the front lid 17 and the top lid 19 and between the top lid and the rear lid 20 and, also, between each guide pin 39 and the associated guide groove 40 to secure a smooth opening or closure of the triple lid assembly and the path of movement of the rear lid 20 may therefore be displaced a slight distance rearwardly from an ideal path of movement thereof, the rear lid 20 may be allowed to ride over the outwardly tapering surfaces 15 in the bosses 11.

Figure 6:
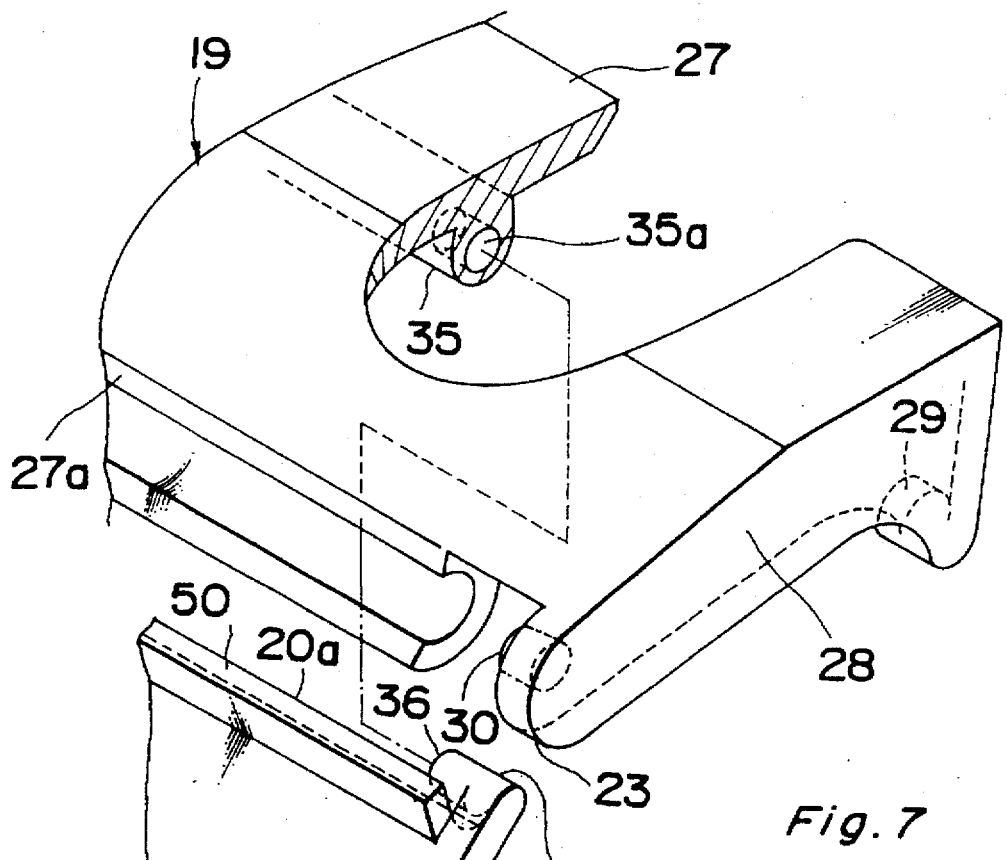
FIG. 6 is an exploded view, on a further enlarged scale, showing a linkage between top and rear lids employed in the magnetic tape cartridge embodying the present invention.
Figure 7:
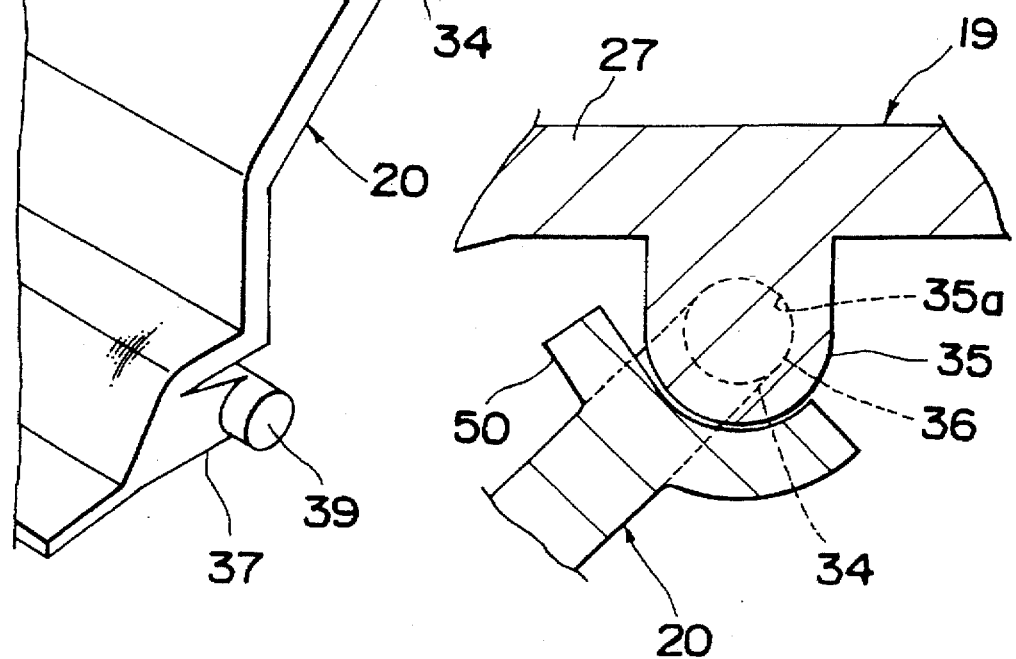
FIG. 7 is a side sectional view, on a further enlarged scale, showing a modified linkage between the top and rear lids.

As best shown in FIGS. 3, 4 and 6, a portion of the upper edge 20a of the rear lid 20 between the 36 bearing pins 36 is integrally formed with a generally elongated wall member 50 that extends over that portion of the upper edge 20a for slidingly bearing the rib 35 from below. As shown in FIGS. 3 and 4, the elongated wall member 50 protrudes generally forwardly in a direction conforming to the direction of thickness of the rear lid 20, but it may protrude forwardly and rearwardly with respect to the directions of thickness of the rear lid 20 as shown in FIG. 7. In either case, the amount of forward protrusion of the elongated wall member 50 must be so chosen that a free face of the elongated wall member 50 remote from the rear lid 20 will not interfere the movement of the top lid 19 and may be brought into contact therewith only when the rear lid 20 is completely moved to the lifted position shown by the phantom line in FIG. 3.

So long as the top and rear lids 19 and 20 are held at the front and lowered positions, respectively, a gap between the inner surface of the top lid 19 and the upper edge 20a of the rear lid 20 is closed by the rib 35 formed integrally with the top lid 19 so as to protrude downwardly therefrom. Also, although a slight gap may be formed between a lower peripheral surface portion of the rib 35 and the elongated wall member 50, a passage communicating between spaces on respective sides of the rear lid 20 through such slight gap represents a curved detour since the elongated wall member 50 substantially encircles the lower peripheral surface portion of the rib 35, thereby minimizing the possibility that dust entering inwardly through a gap between the top lid 19 and the top panel of the casing 1 will reach a portion of the loading bay 6 where that portion 2a of magnetic recording tape 2 is situated.

Although not always essential in the practice of the present invention, the front lid 17 may have an elongated groove 60 defined in an inner surface of the rectangular plate 21 adjacent a lower edge so as to extend lengthwise thereof, as best shown in FIG. 3, so that, when and so long as the front lid 17 and the rear lid 20 are in the forwardly oriented and lowered positions, respectively, a lower edge of the rear lid 20 is received in the elongated groove 60 to thereby close that portion of the loading bay 6, where that portion 2a of magnetic recording tape 2 is situated, for avoiding any possible ingress of foreign matter into that portion of the loading bay 6.

It is to be noted that, although in the foregoing embodiment only the top boss segments 12 have been shown and described as having the reduced outer diameter as compared with the outer diameter of the bottom boss segments 13, the bottom boss segments 13 may have an equally reduced outer diameter depending upon the profile of the path of movement of the rear lid 20 between the lowered and lifted positions.

Figure 8B:
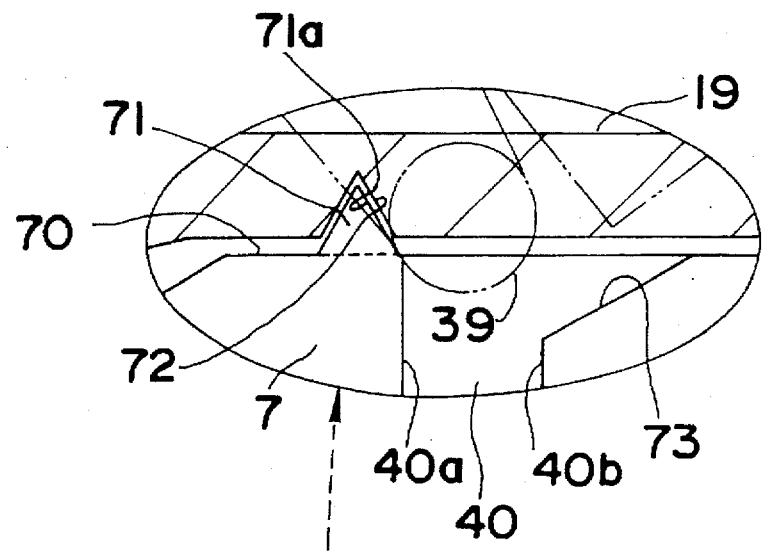
FIG. 8B is a fragmentary side sectional view, on a further enlarged scale, showing a portion encompassed in an oval in FIG. 8A.
Figure 8A:
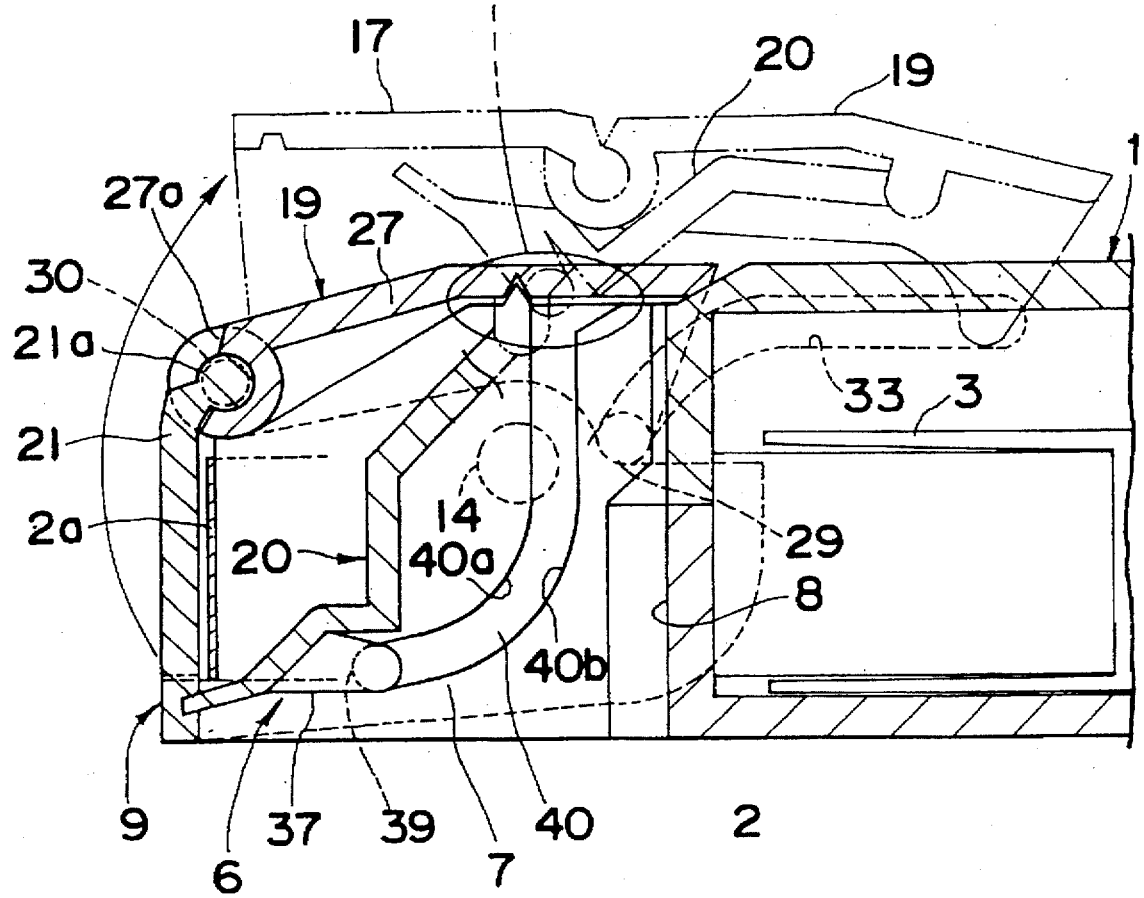
FIG. 8A is a view similar to FIG. 3, showing a different embodiment of the present invention.

FIGS. 8A and 8B illustrate the magnetic tape cartridge according to a second preferred embodiment of the present invention which is substantially similar to that according to the foregoing embodiment, but differs therefrom in respect of the details of each of the guide grooves 40 that are formed on the inner side walls 7 of the respective box arms 4. In describing the second preferred embodiment of the present invention, reference will be made only to one of the guide grooves 40 since the latter are formed in the respective inner side walls 7 in a mirror image fashion relative to each other.

As shown in FIGS. 8A and 8B, the guide groove 40 is delimited by inner side surfaces 40a and 40b spaced from each other a distance sufficient to accommodate the diameter of the associated guide pin 39. This guide groove 40 has an upper end opening upwardly at an upper face 70 of the associated inner side wall 7. However, in order for the rear lid 20 to be lifted an increased distance upwardly when held in the lifted position as shown by the phantom line, a generally triangular protuberance 71 is fixedly mounted on, or formed integrally with, the upper face 70 of the inner side wall 7 and protrude therefrom so as to converge upwardly as best shown in FIG. 8B. The triangular protuberance 71 has a rear inclined face 71a continued to the inner side surface 40a to render an upper end of the guide groove 40 to represent a substantially upwardly flared configuration in cooperation with an upper end of the inner side surface 40b which is inclined at 73 to separate away from the inner side surface 40a.

The use of the triangular protuberance 71 protruding upwardly from the upper face 70 of the inner side wall 7 such as described above may result in an interference between it and the inner surface of the rectangular plate 27 of the top lid 19 when the top lid 19 is moved from the rear position shown by the phantom line to the front position shown by the solid line. In order to avoid this interference, a recess 72 is defined in an inner surface of the rectangular plate 27 of the top lid 19 to accommodate the triangular protuberance 71 when the top lid 19 is in the front position.

According to the second preferred embodiment shown in FIGS. 8A and 8B, even though the rear lid 20 is moved to the lifted position with the guide pins 39 positioned above and departing partially from the upper ends of the guide grooves 40, the triangular protuberances 71 serve to guide the guide pins 39 smoothly into the associated guide grooves 40 with the guide pins 39 sliding along the inclined face 71a as the rear lid 20 in the lifted position is moved towards the lowered position in response to the movement of the top lid 19 from the rear position towards the front position then following the movement of the front lid 17 from the upwardly oriented position towards the forwardly oriented position. Thus, it will readily be understood that the rear inclined face 71 plays an important role to facilitate a smooth movement of the rear lid 20 from the lifted position back towards the lowered position.

In addition, the use of the inclined upper ends 73 of the inner side faces 40b of the respective guide grooves 40, which flare the upper ends of the guide grooves in cooperation with the inclined faces 71a of the triangular protuberances 71, is also effective not only to smoothly guide the rear lid 20 rearwardly towards the lifted position at a final stage of movement of the top lid 19 towards the rear position, but also to guide the guide pins 39 in cooperation with the inclined upper ends 73 so as to be smoothly received into the associated guide grooves 40 as the rear lid 20 is moved from the lifted position towards the lowered position.

As described hereinbefore, when the top lid 19 is in the front position, the triangular protuberances 71 are received in the respective recesses 72 defined in the top lid 19 to close the upper opening of the loading bay 6. Therefore, no gap is substantially formed between the upper faces 70 of the inner side walls 7 and the opposite ends of the top lid 19 to thereby avoid any possible ingress of foreign matter into the loading bay 6.

In the case where the front, top and rear lids 17, 19 and 20 are operatively linked together such as in the present invention, a sufficient clearance is required at various joints and guide grooves to facilitate a smooth movement of each of those lids. The stroke of movement of each of those lids must also be given a sufficient allowance to provide a margin relative to the magnetic tape player or deck. These considerations are important particularly in the case of a compact magnetic tape cartridge and, for example, if the front lid 17 is made to pivot 90° to open, an angle of opening of 100° may often be required to permit the front lid 17 to open.

In the case of such a magnetic tape cartridge, accumulation of design errors occurring in the front, top and rear lids 17, 19 and 20 may results in such a possibility that, when the front lid is pivoted the full stroke of pivotal movement thereof, the guide pins 39 integral with the front lid 17 may depart from the associated guide grooves 40. Once this happens, a problem would occur that the magnetic tape cartridge will be entangled within the magnetic tape player.

In accordance with a third preferred embodiment of the present invention, means is provided in the top lid 19 for regulating the maximum angle of opening of the front lid 17. More specifically, as shown in FIGS. 9 and 10A to 10C, by adjusting the position at which a dust removal wall 80, dimensions have been so chosen that, when the guide pin 29 integral with the top lid 19 is brought into engagement with a front end of the dust removal wall 80, the angle of opening of the front lid 17 can be set to 90°. Even in this design, since the guide pin 29 integral with the top lid 19 can slightly slide over the dust removal wall 80, there is no possibility that entanglement of the magnetic tape cartridge within the magnetic tape player resulting from an insufficient angle of opening of the front lid 17 will occur. Moreover, any possible departure of the guide pins 39 from the associated guide grooves 40 which would otherwise occur if the front lid 17 is excessively opened, i.e., moved towards the upwardly oriented position, will not occur.

As best shown in FIG. 9, foreign matter deposited in the guide grooves 33 defined in the side walls 24 is scraped by the guide pins 29 and then expelled rearwardly of the guide grooves 33 as the top lid 19 is pivoted to open, i.e., pivoted towards the rear position. However, in the illustrated example, since the dust removal wall 80 is formed so as to continue from the rear end of each guide groove 33, the foreign matter collected by the associated guide pin 29 is pushed towards the dust removal wall 80 and remains there when the top lid 19 is moved towards the front position. Accordingly, as the foreign matter is repeatedly pushed towards the rear end of the associated guide groove 33, the foreign matter accumulated at the rear end of the guide groove 33 is subsequently pushed outwardly of the casing having been guided along the dust removal wall 80, and therefore, there is no possibility that the accumulated foreign matter may remain there in the form as gathered and compressed.

FIGS. 10A to 10B illustrate respective modifications of the dust removal wall 80. In the example shown in FIG. 10A, each guide groove 33 has its rear end rounded and the dust removal wall 80 is so shaped as to represent a portion of the circle that extends from one straight portion of the guide groove 33 to the opposite straight portion of the guide groove 33.

In the example shown in FIG. 10B, the dust removal wall 80 is so designed as to extend diagonally downwardly from the rear end of the guide groove 33 to provide an inclined passage.

In the example shown in FIG. 10C, the dust removal wall 80 is so designed as to extend downwardly from the rear end of the guide groove 33 to provide an inclined passage. It is to be noted that the dust removal wall 80 may have an arcuately protruding surface or an arcuately recessed surface.

According to the present invention as hereinbefore described fully, each of the cylindrical bosses 11 is comprised of the top and bottom boss segments 12 and 13 integral with the respective top and bottom casing halves 1a and 1b, said top boss segment 12 having an outer diameter smaller than that of the bottom boss segment 13 to allow that lateral portion 12a of the periphery of the top boss segment 12 to protrude into the loading bay 3 a radial distance smaller than that lateral portion 13a of the periphery of the bottom boss segment 13. Accordingly, it is possible to avoid any possible interference between the bosses 11 and the rear lid 20 while a sufficient diameter is secured in each of the positioning holes 9 and, therefore, a smooth movement of the rear lid 20 between the lowered and lifted position is possible, thereby making it possible to make the system compact.

Also, a transit between the top and bottom boss segments 12 and 13 in each boss 11 is defined by the outwardly tapering surface 15 formed at the upper end of the bottom boss segment 13. Accordingly, even though the path of movement of the rear lid 20 between the lowered and lifted positions is defined at a position slightly rearwardly with respect to the ideal path of movement thereof, the rear lid 20 may slide over the outwardly tapering surface 15 to facilitate a smooth movement of the rear lid 20.

Although the present invention has been described in connection with the preferred embodiments thereof with reference to the accompanying drawings, it is to be noted that various changes and modifications are apparent to those skilled in the art. For example, although in the foregoing description, the cartridge has been described as accommodating the length of magnetic recording tape, the cartridge embodying the present invention may be used to accommodate a length of head cleaning tape for cleaning one or more magnetic recording and/or reproducing heads used in the tape player. Accordingly such changes and modifications are to be understood as included within the scope of the present invention as defined by the appended claims, unless they depart therefrom.

What is claimed is:

1. A magnetic tape cartridge which comprises:

a casing including top and bottom panels and a peripheral wall disposed between the top and bottom panels to keep them spaced apart a distance to define a tape chamber, said peripheral wall including front and rear wall sections and a pair of side wall sections, with each wall section having a first and second end respectively, and each of said wall members being assembled together to render the tape cartridge to represent a generally rectangular box-like configuration, with a pair of box arms respectively protruding outwardly from said first and second ends of the front wall section, opposite portions of the side wall sections adjacent the box arms having respective outer surfaces and each of said outer surfaces having formed therein a guide groove, and said box arms being in communication with the tape chamber so as to form a loading bay that opens upwardly, frontwardly and downwardly and that is delimited by upwardly, frontwardly and downwardly oriented open areas;

a pair of freely rotatable reels accommodated within the casing;

a length of magnetic recording tape having opposite ends that are anchored to each of said reels, respectively, and said recording tape being adapted to travel from one of said reels to the other of said reels, when the tape cartridge is in use within a magnetic recording or reproducing apparatus, with a portion of the length of magnetic recording tape traversing across the loading bay at a location spaced a distance from the front wall section;

a lid assembly for selectively concealing and exposing said portion of the magnetic recording tape and including front, top and rear lids that are operatively linked together, with each of said lids having a first and a second end portion;

said front lid being carried by the casing for pivotal movement about a traverse axis, extending parallel to the front wall section, between a first and a second position, said front lid in said first position closing the frontwardly oriented open area of the loading bay, but said front lid in said second position opening the frontwardly oriented open area of the loading bay;

said top lid hingedly connected with the front lid and movable between a third and a fourth position in unison with the movement of the front lid between the first and the second positions, respectively, said top lid in said third position closing the upwardly oriented open area of the loading bay, but said top lid in said fourth position opening the upwardly oriented open area of the loading bay, and said top lid having a pair of end walls that are respectively formed at the first and second end portions thereof, with each of said end walls of the top lid having formed integral therewith a guide pin for slidably engaging each of said guide grooves that are formed in each of the respective outer surfaces of said box arms;

said rear lid hingedly connected to the top lid and movable between fifth and sixth positions in unison with the movement of the top lid between the third and fourth positions, respectively, said rear lid in said fifth position being positioned within the loading bay and rearwardly of the front lid to substantially confine said portion of the magnetic recording tape within a space delimited between the front lid in the first position and the rear lid in the fifth position, with said rear lid in said sixth position being positioned generally above the loading bay and in part beneath the front lid in the second position and in part beneath the top lid in the fourth position, said portion of the magnetic recording tape being exposed to the outside when the front lid is moved to the second position, accompanied by movement of the top lid to the fourth position which is in turn accompanied by movement of the rear lid to the sixth position; and at least a first and a second generally cylindrical boss extending between the top and bottom panels of the casing within the casing;

each of said first and second cylindrical bosses being respectively positioned at a point of intersection between an inner side wall of one of said respective box arms protruding outwardly from the first and second ends of the front wall section, so that said first and second cylindrical bosses partially protrude laterally into the loading bay;

each of said first and second cylindrical bosses having a positioning hole defined axially therein so as to extend exteriorly through one of the top and bottom walls of the casing;

each of said first and second cylindrical bosses including an upper and a lower boss segment that are aligned axially with each other, said upper boss segment having an outer diameter smaller than that of said lower boss segment, so that there is no possibility of the cylindrical bosses interfering with the movement of the rear lid; and the top lid in its rear position being parallel to the top panel of the cassette.

2. The magnetic tape cartridge as claimed in claim 1, wherein a transit between the upper and lower boss segments is defined by a tapering surface defined in an upper end of the lower boss segment, said tapering surface tapering radially inwardly towards the upper boss segment.

3. The magnetic tape cartridge as claimed in claim 1, wherein said casing is comprised of upper and lower casing halves having the top and bottom panels, respectively, and wherein said upper and lower boss segments are formed integrally with the top and bottom panels, respectively, said upper and lower boss segments being utilized to pass respective set screws therethrough to connect the upper and lower casing halves together.

4. The magnetic tape cartridge as claimed in claim 1, wherein said top lid has a rib extending lengthwise of the top lid and said rear lid has a bearing protuberance protruding laterally outwardly from each one of two opposite edges thereof that are adjacent to the top lid and each of said bearing protuberances carrying a corresponding pivot pin that is adapted to be pivotally inserted into one of two respective opposite ends of said rib so as to define a pivot axis through which the rear lid is hingedly connected with the top lid, one of said opposite edges of the rear lid being formed with an elongated wall member extending between the two bearing protuberances so as to encircle generally halfway the rib.

5. The magnetic tape cartridge as claimed in claim 4, wherein said elongated wall member extending between the bearing protuberances protrudes laterally from the rear lid in a direction conforming to the direction of thickness of the rear lid.

* * * * *